United States Patent
Tsutsumi

(10) Patent No.: US 9,314,007 B2
(45) Date of Patent: Apr. 19, 2016

(54) FISHING SPINNING REEL

(71) Applicant: Globeride, Inc., Tokyo (JP)

(72) Inventor: Wataru Tsutsumi, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 14/634,306

(22) Filed: Feb. 27, 2015

(65) Prior Publication Data

US 2015/0272102 A1 Oct. 1, 2015

(30) Foreign Application Priority Data

Mar. 28, 2014 (JP) ................................. 2014-069468

(51) Int. Cl.
 *A01K 89/01* (2006.01)
 *A01K 89/015* (2006.01)

(52) U.S. Cl.
 CPC ............... *A01K 89/015* (2013.01); *A01K 89/01* (2013.01)

(58) Field of Classification Search
 CPC ............ A01K 89/01; A01K 89/01121; A01K 89/01123; A01K 89/01126
 See application file for complete search history.

(56) References Cited

U.S. PATENT DOCUMENTS

| | | | |
|---|---|---|---|
| 5,476,230 A | 12/1995 | Yamaguchi | |
| 5,601,244 A * | 2/1997 | Kawabe | A01K 89/01 242/232 |
| 5,855,328 A * | 1/1999 | Hitomi | A01K 89/01 242/245 |
| 5,857,631 A * | 1/1999 | Sato | A01K 89/01 242/245 |
| 6,857,588 B1 * | 2/2005 | Chang | A01K 89/01 242/310 |
| 2002/0175236 A1* | 11/2002 | Hitomi | A01K 89/01 242/230 |
| 2004/0206840 A1* | 10/2004 | Kitajima | A01K 89/01 242/306 |
| 2004/0227028 A1* | 11/2004 | Nishikawa | A01K 89/01 242/249 |
| 2005/0040269 A1* | 2/2005 | Iwabuchi | A01K 89/01 242/311 |
| 2005/0051652 A1* | 3/2005 | Myojo | A01K 89/01 242/311 |
| 2006/0266861 A1* | 11/2006 | Kitajima | A01K 89/01 242/322 |
| 2008/0191079 A1* | 8/2008 | Sugahara | A01K 89/01 242/230 |
| 2009/0072066 A1* | 3/2009 | Saito | A01K 89/0114 242/273 |
| 2009/0236456 A1* | 9/2009 | Lee | A01K 89/01 242/312 |
| 2011/0042500 A1* | 2/2011 | Saito | A01K 89/0111 242/224 |
| 2012/0048981 A1* | 3/2012 | Ohara | A01K 89/0108 242/230 |

FOREIGN PATENT DOCUMENTS

| | | |
|---|---|---|
| JP | 6-13471 | 2/1994 |
| JP | 2006-262729 | 10/2006 |

OTHER PUBLICATIONS

Extended European Search Report dated Sep. 30, 2015 for European Patent Appln. No. 15156623.9.

* cited by examiner

*Primary Examiner* — Emmanuel M Marcelo
(74) *Attorney, Agent, or Firm* — Pillsbury Winthrop Shaw Pittman, LLP

(57) ABSTRACT

One object is to mount a cover member on a reel body without looseness. In accordance with one aspect, the fishing spinning reel comprising: a reel body; a cover mounting portion provided on a rear portion of the reel body; and a cover member mounted on the cover mounting portion and covering the rear portion of the reel body, the cover member comprising: at least one first abutting portion abutting the cover mounting portion from behind: and at least one second abutting portion abutting the cover mounting portion from both left and right sides, wherein when the cover member is mounted on the cover mounting portion via the first abutting portion and the second abutting portion, groove-like gaps are formed in left and right side surfaces of the reel body between border portions of the cover mounting portion and left and right side edges of the cover member.

4 Claims, 20 Drawing Sheets

FISHING SPINNING REEL

CROSS-REFERENCE TO RELATED APPLICATIONS

This application is based on and claims the benefit of priority from Japanese Patent Application Serial No. 2014-069648 (filed on Mar. 28, 2014), the contents of which are hereby incorporated by reference in their entirety.

TECHNICAL FIELD

The present invention relates to a fishing spinning reel.

BACKGROUND

There are conventionally known fishing spinning reels wherein a cover member covers a rear portion of a reel body for protection of the rear portion of the reel body (see, for example, Japanese Utility Model Application Publication No. Hei 6-13471 (the "'471 Publication")). In the fishing spinning reel disclosed in the '471 Publication, a cover member is mounted on a cover mounting portion provided on the rear portion of the reel body. On the lower portion of the reel body may be provided a hook-like engagement portion which supports the front end of the cover member. The cover member has a guide surface for biasing the cover member toward the border portion of the reel body by contacting the engagement portion.

In the above fishing spinning reel, the cover member is fixed by screwing with its front end engaged with the engagement portion. Thus, the guide surface is urged by the engagement portion, such that the cover member is biased toward the border portion of the cover mounting portion on the left and right side surfaces of the reel body. The side edge of the cover member comes close to the border portion of the reel body, and the cover member is fixed on the reel body with a reduced gap between the side edge and the border portion.

However, in the fishing spinning reel of the '471 Publication, the most part of the side edge of the cover member is mated with the reel body along the border portion (reel body); therefore, there is difficulty in mating the side edge of the cover member with the border portion to accurate conformity. Accordingly, the cover member may be loosely fixed on the reel body due to a step or gap produced on the portions mated.

The present invention is intended to overcome the above problem, and one object thereof is to provide a fishing spinning reel wherein a cover member can be tightly mounted on a reel body.

SUMMARY

To the above end, the fishing spinning reel of the present invention comprises: a reel body; a cover mounting portion provided on a rear portion of the reel body; and a cover member mounted on the cover mounting portion and covering the rear portion of the reel body, the cover member comprising: at least one first abutting portion abutting the cover mounting portion from behind: and at least one second abutting portion abutting the cover mounting portion from both left and right sides, wherein when the cover member is mounted on the cover mounting portion via the first abutting portion and the second abutting portion, groove-like gaps are formed in left and right side surfaces of the reel body between border portions of the cover mounting portion and left and right side edges of the cover member.

In this fishing spinning reel, the cover member is positioned via the first abutting portion and the second abutting portion abutting the rear portion of the reel body in two directions. The cover member is mounted so as to maintain groove-like gaps between the border portions of the cover mounting portion and the left and right side edges of the cover member.

The present invention is characterized in that "the at least one first abutting portion comprises at least two first abutting portions provided at at least two positions on the cover member spaced in a top-bottom direction."

In this fishing spinning reel, the cover member can be mounted with at least two portions thereof spaced in a top-bottom direction abutting the cover mounting portion from behind.

Further, the present invention is characterized in that "the at least one second abutting portion is provided at a substantially middle position on the cover member in a top-bottom direction."

In this fishing spinning reel, the cover member can be mounted with the substantially middle portion thereof in a top-bottom direction abutting the cover mounting portion from both left and right sides.

Further, the present invention is characterized in that "the left and right side edges of the cover member are chamfered."

This fishing spinning reel reduces the risk of snagging of a line contacting the cover member.

In the present invention, the first abutting portions and the second abutting portions may abut the cover mounting portion such that the cover member may be positioned; therefore, the cover member can be installed with an excellent quality.

Also, since the cover member may be positioned while abutting the rear portion of the reel body from two directions, the cover member can be mounted on the reel body with the looseness suppressed adequately.

Further, since there are groove-like gaps maintained between the left and right side edges of the cover member mounted and the border portions of the cover mounting portion, the left and right side edges of the cover member may not be mated with the border portions. Therefore, the cover member can be mounted on the reel body without looseness.

Since the presence of the first abutting portions may enable positioning of at least two portions in the cover member spaced in a top-bottom direction onto the cover mounting portion, the cover member can be stably mounted on the cover mounting portion.

Since the presence of the second abutting portions may enable the substantially middle portion of the cover member in the top-bottom direction to abut the cover mounting portion from both left and right sides for mounting, the cover member can be stably mounted while suppressing the looseness in the left-right direction adequately.

Further, since the left and right side edges of the cover member are chamfered, the risk of snagging of a line contacting the cover member may be reduced. Therefore, this arrangement may reduce loss of operation caused by snagging of a line. Therefore, excellent fishing operability is obtained.

BRIEF DESCRIPTION OF THE DRAWINGS

FIG. 7a is an enlarged sectional view taken along the line A-A in FIG. 6a; and FIG. 7b is an enlarged sectional view taken along the line B-B in FIG. 6a.

FIG. 8a is an enlarged sectional view taken along the line C-C in FIG. 6a; and FIG. 8b is an enlarged sectional view taken along the line D-D in FIG. 6a.

FIG. 9a is an enlarged sectional view taken along the line E-E in FIG. 6a; FIG. 9b is an enlarged sectional view taken along the line F-F in FIG. 6a; and FIG. 9c is an enlarged sectional view taken along the line G-G in FIG. 6a.

DESCRIPTION OF EXAMPLE EMBODIMENTS

Embodiments of a fishing spinning reel according to the present disclosure will be now described with reference to the drawings. Across the embodiments, the same elements are denoted with the same numeral; and duplicate description will be omitted. In the following description, the directions referred to as "front and rear (back and forth)" and "top and bottom" are based on those shown in FIG. 1, In FIGS. 3, 4, and 6a, the handle shaft and the support structure thereof is omitted.

Figure 1:
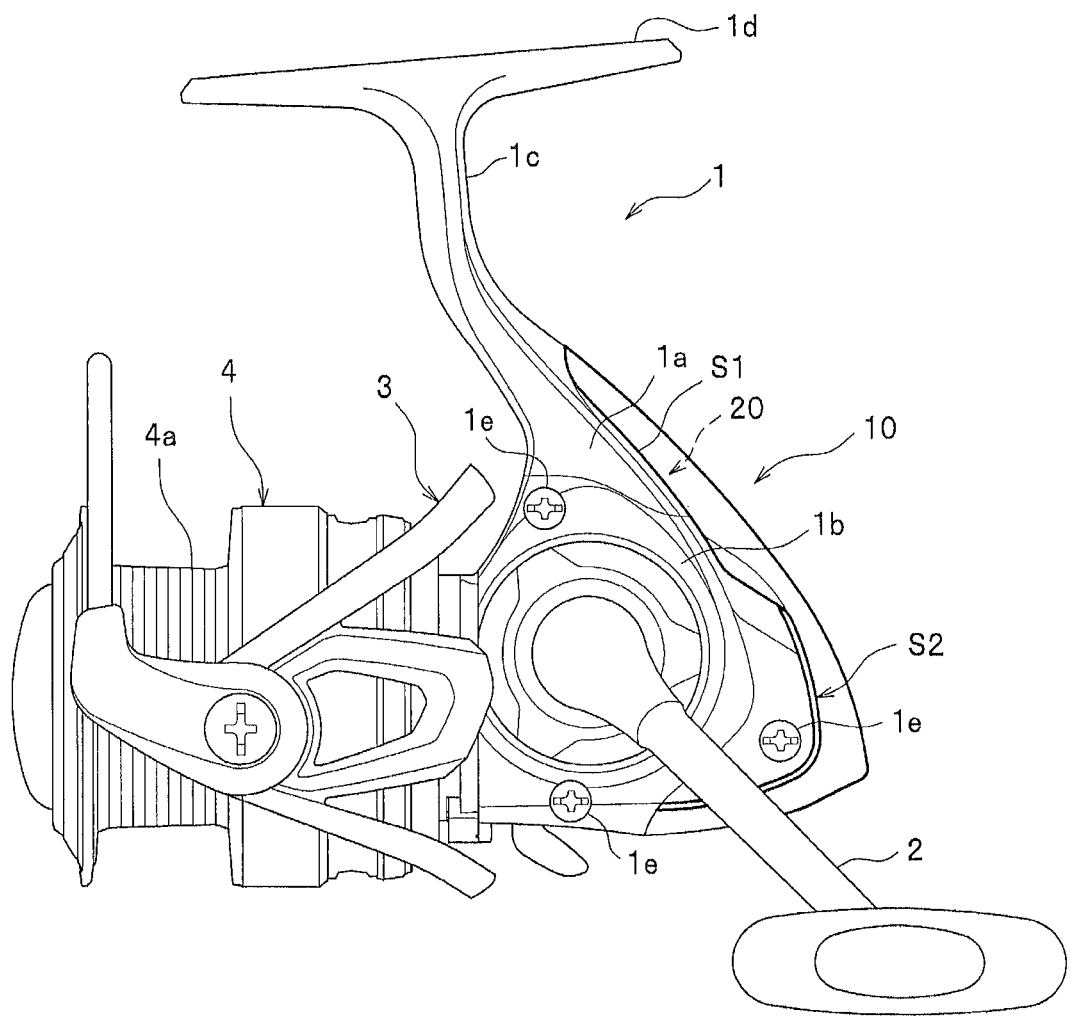
FIG. 1 shows the entirety of the fishing spinning reel according to an embodiment of the present invention.

As shown in FIG. 1, the fishing spinning reel may include a reel body 1, a rotor 3 rotatably disposed in front of the reel body 1, and a spool 4 provided so as to be movable back and forth in synchronization with the rotation of the rotor 3. On the rear portion of the reel body 1 may be mounted a cover member 10 so as to widely cover the reel body 1 from the bottom end to the rear end thereof. The cover member 10 may have a predetermined thickness.

The reel body 1 may be rigidly formed of a lightweight material, for example, metals such as aluminum alloys, titanium alloys, or magnesium alloys, high strength resins such as ABS resin or PA resin, or fiber reinforced resins such as carbon fiber reinforced plastics (CFRP) or glass fiber reinforced plastic (GFRP). The reel body 1 may be provided as necessary with a decoration layer on the surface thereof for improving the appearance. The reel body 1 may include a reel body 1a having an internal space SP (see FIG. 2) openable at one side thereof and a cover body 1b closing the internal space SP.

The reel body 1a may be provided with a leg 1c extending upward. On the distal end (upper end) of the leg 1c may be integrally formed a rod mounting portion 1d to be mounted on a fishing rod (not shown) in a front-rear direction.

The cover body 1b may be accurately positioned via an appropriate positioning member disposed at an open end of the reel body 1a. In the embodiment, the cover body 1b may be fixed on the reel body 1a by fastening with three screws 1e (see FIG. 1). Both the reel body 1a and the cover body 1b may be provided with bearing members (not shown) which rotatably support the handle shaft 2a (see FIG. 2). A handle 2 may be mounted on a projecting end of the handle shaft 2a.

Figure 2:
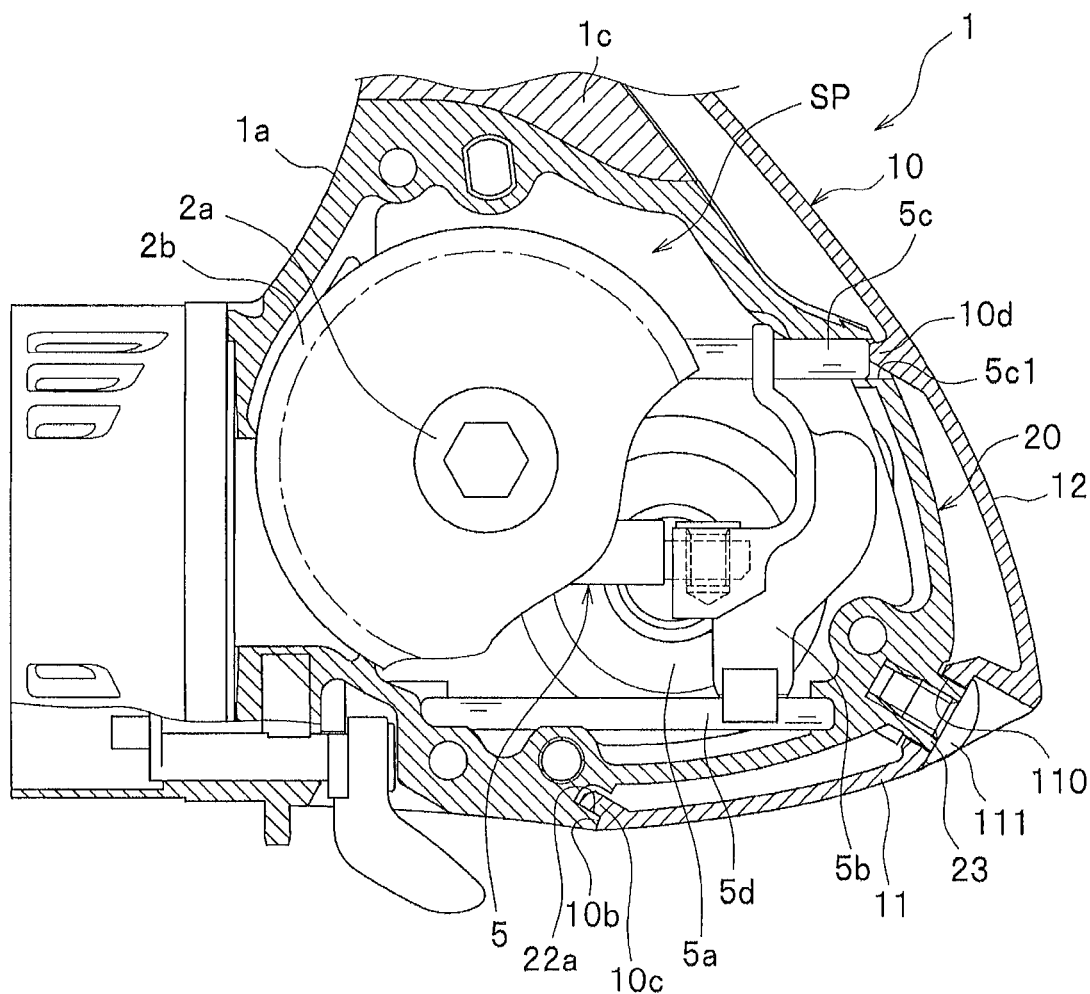
FIG. 2 is a structural diagram showing the rear portion of the reel body.

As shown in FIG. 2, a drive gear 2b formed integrally with the handle shaft 2a may be disposed in the internal space SP. The drive gear 2b may rotationally drive the rotor 3 via a pinion gear of a wind drive device (not shown). In synchronization with this rotational drive, an interlocking gear 5a included in a spool reciprocation device may be rotated, and a pin (not shown) disposed at an eccentric position of the interlocking gear 5a may reciprocate a slide member 5b and a spool shaft 5 while moving in a cam groove (not shown) of the slide member 5b. The spool shaft 5 may be guided by the support members 5c, 5d which are integrally formed on the reel body 1a and placed in the internal space SP, while moving back and forth together with a spool 4 disposed on the end thereof (see FIG. 1). Smooth movements of these members are ensured by the reel body 1a and the cover body 1b having rigid structure.

In such a fishing spinning reel, the handle 2 may be rotated such that the handle shaft 2a may be rotated, the spool 4 may be reciprocated back and forth via the spool reciprocation device, and the rotor 3 may be rotationally driven via the wind drive device. Thus, a fishing line may be evenly wound around the line-winding shell 4a of the spool 4 via the line guide. The handle 2 may be removed from the left-side position shown in the figure to the opposite side as necessary.

Figure 3A:
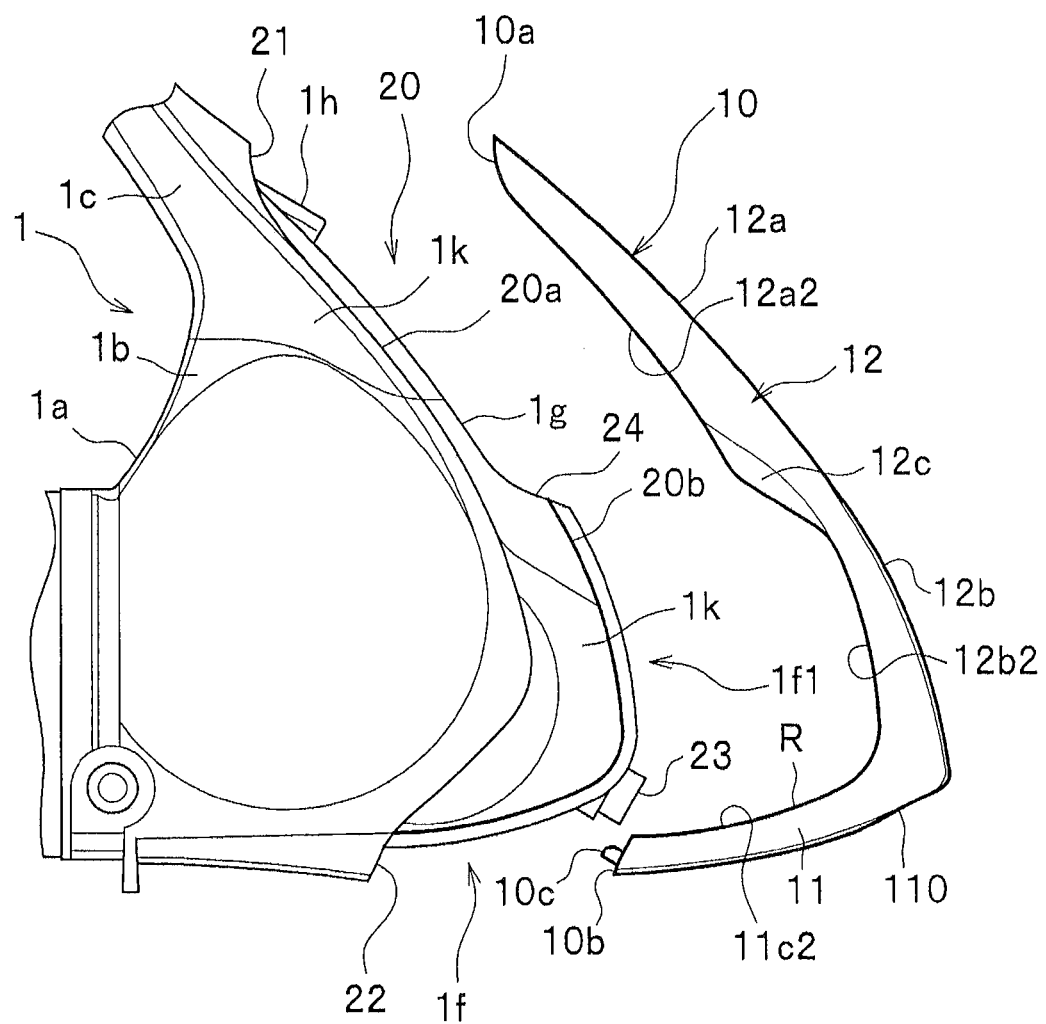
FIG. 3a is a side view showing the rear portion of the reel body freed of the cover member.
Figure 3B:
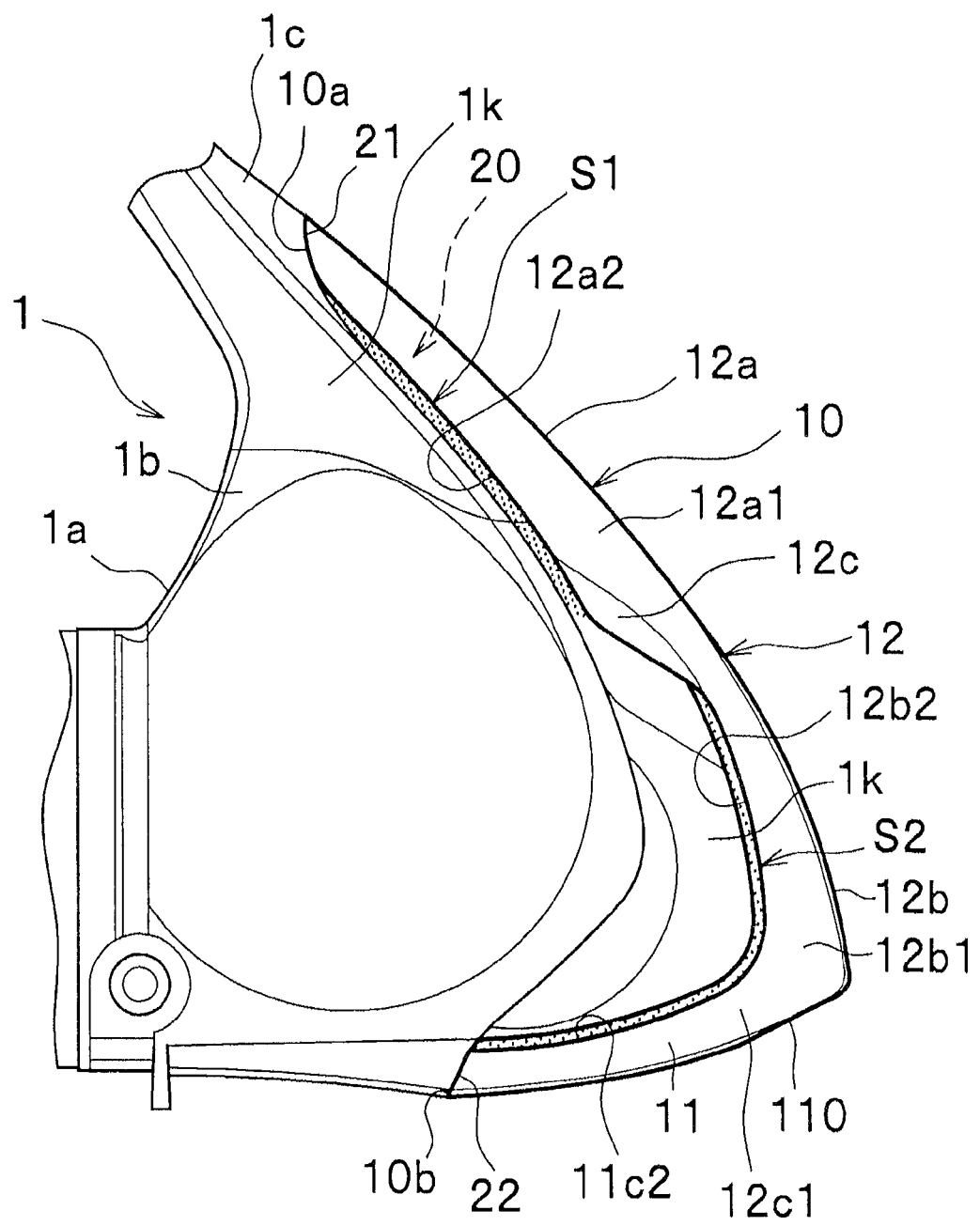
FIG. 3b is a side view showing the rear portion of the reel body having the cover member mounted thereon.
Figure 4A:
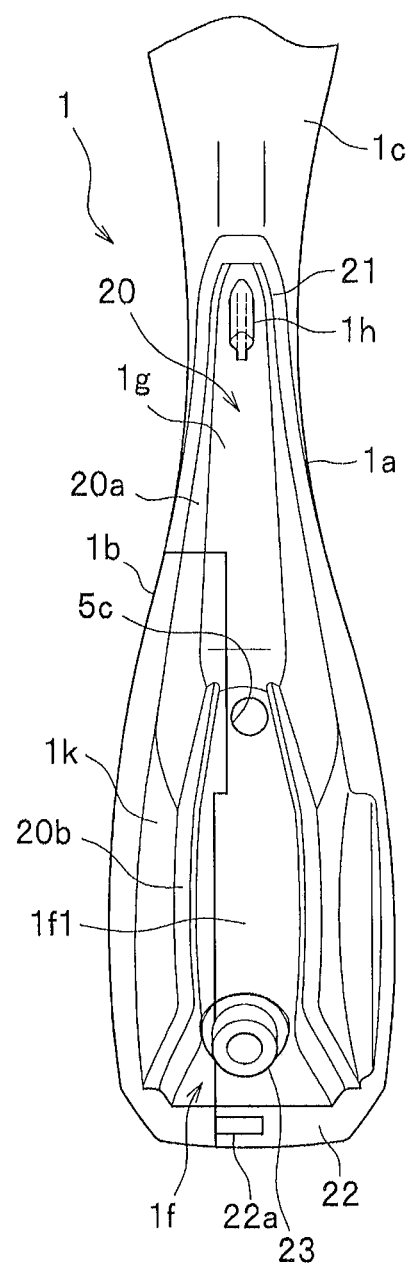
FIG. 4a is a rear view showing the rear portion of the reel body freed of the cover member.
Figure 4B:
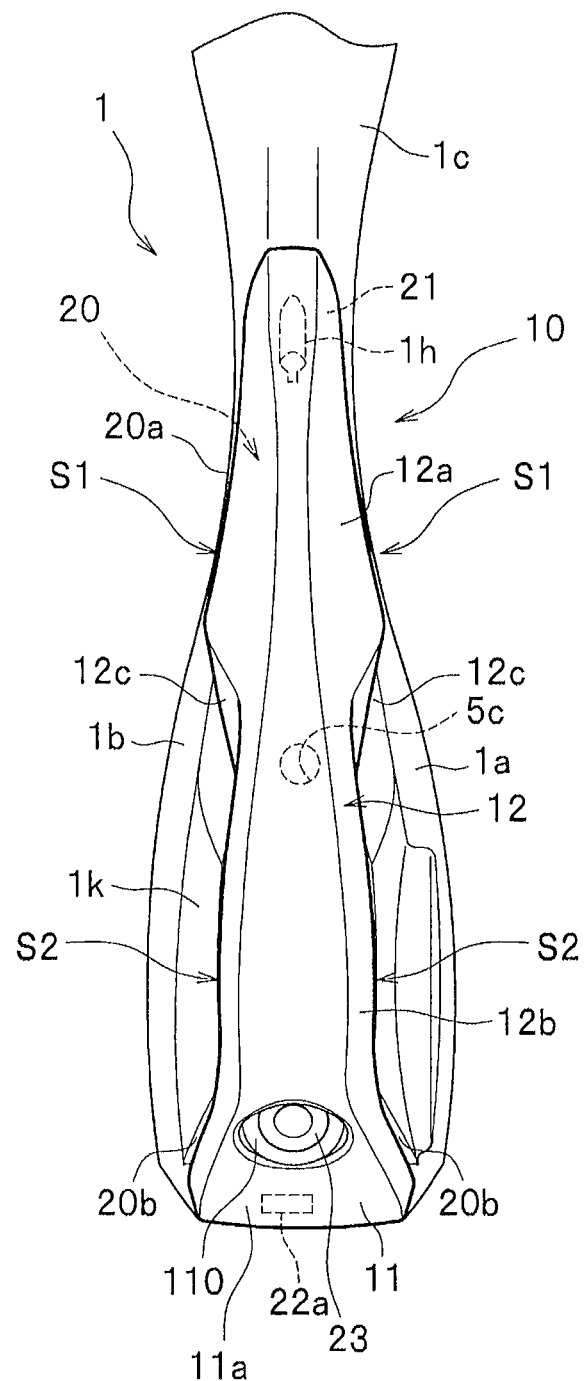
FIG. 4b is a rear view showing the rear portion of the reel body having the cover member mounted thereon.

As shown in FIG. 3a, the cover mounting portion 20 may be provided on the rear portion of the reel body 1. As shown in FIG. 3b, the cover member 10 may be removably mounted on the cover mounting portion 20.

The cover member 10 as a whole may have a general L-shape. The cover member 10 may include a base 11 mounted on a lower portion of the rear portion of the reel body 1, and a rising portion 12 extending forwardly from the rear end of the base 11 in an obliquely upward direction along the rear end of the reel body 1. The cover member 10 may be mounted on the cover mounting portion 20 with a setscrew 111 (see FIG. 2) inserted through a screw hole 110 (see FIG. 2) provided in the base 11.

As shown in FIGS. 3a and 3b, the base 11 may be bent downward along the front-rear direction of the lower surface of the rear portion of the reel body 1. As shown in FIGS. 5a to 5d, the base 11 may be formed in a flat shape. As shown in FIGS. 3a and 3b, the front end 10b of the base 11 may have a shape conforming to a lower front wall 22 (see FIG. 3a) of the cover mounting portion 20, and is configured to abut the lower front wall 22 from behind (in an obliquely upward direction) when the cover member 10 is mounted. On the front end 10b may be formed an engagement projection 10c projecting forwardly in an obliquely upward direction. As shown in FIG. 2, the engagement projection 20c can be engaged with an engagement hole 22a provided in the lower front wall 22 (see FIG. 3a).

As shown in FIGS. 2, 4b, 5a, 5c, and 5d, the screw hole 110 may be formed in the rear end of the base 11. As shown in FIG. 2, when the cover member 10 is mounted, the screw hole 110 may be fitted around the boss 23 having a bottomed cylindrical shape provided on the cover mounting portion 20 (see FIG. 7b). The edge of the screw hole 110 may be contacted by the head of the setscrew 111 screwed into the boss 23. The setscrew 111 may be tightened to fix the cover member 10 on the cover mounting portion 20. The edge of the screw hole 110 may be formed at such a depth that the head of the screw 111 does not project beyond the outer surface of the base 11.

Figure 5A:
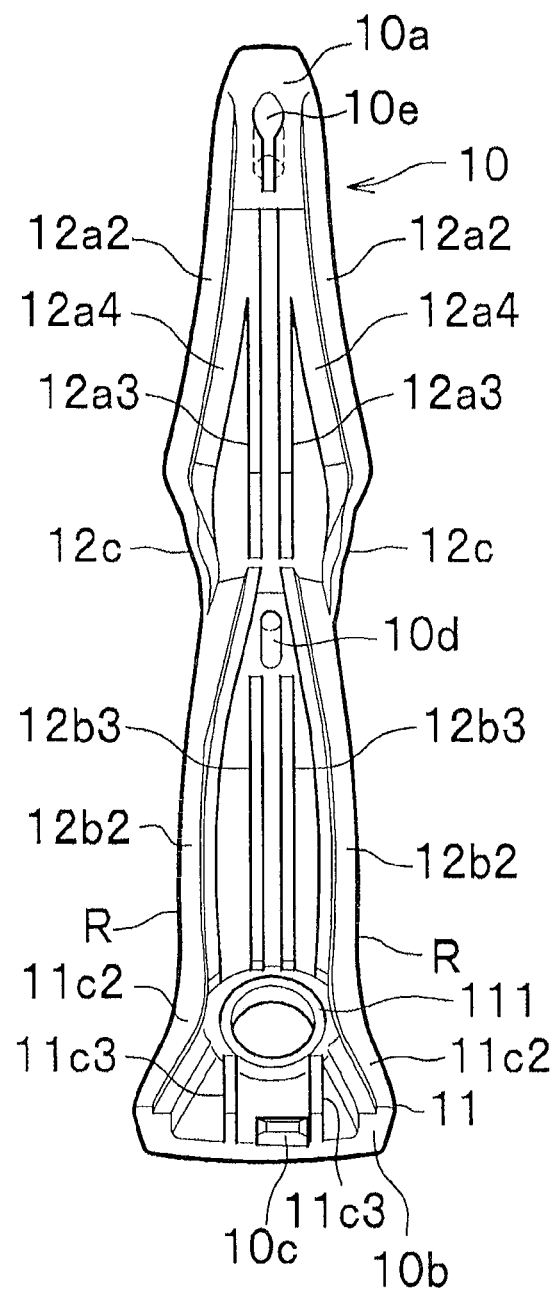
FIG. 5a is a front view of the cover member.
Figure 6A:
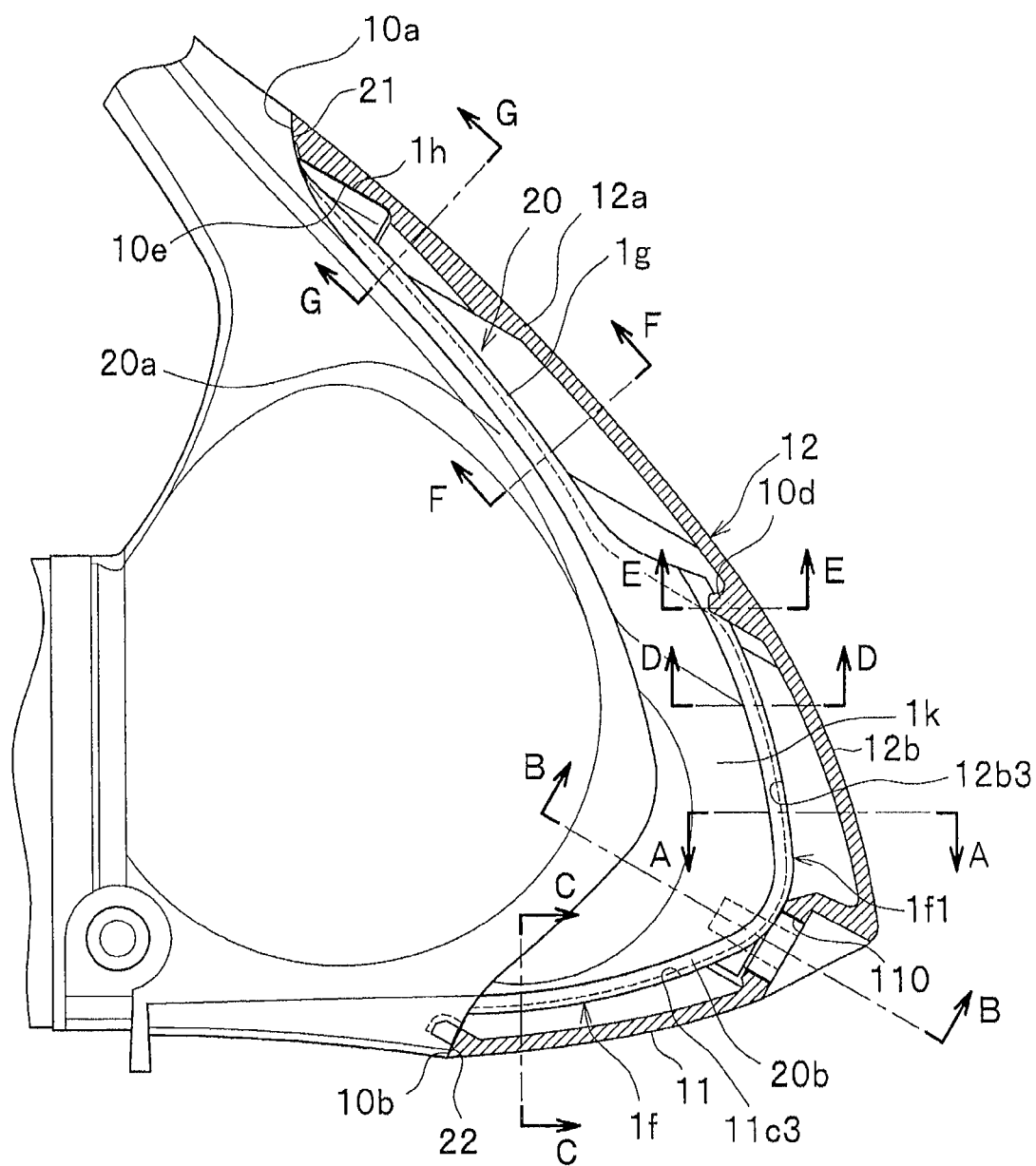
FIG. 6a is a sectional view showing the cover member mounted.
Figure 8A:
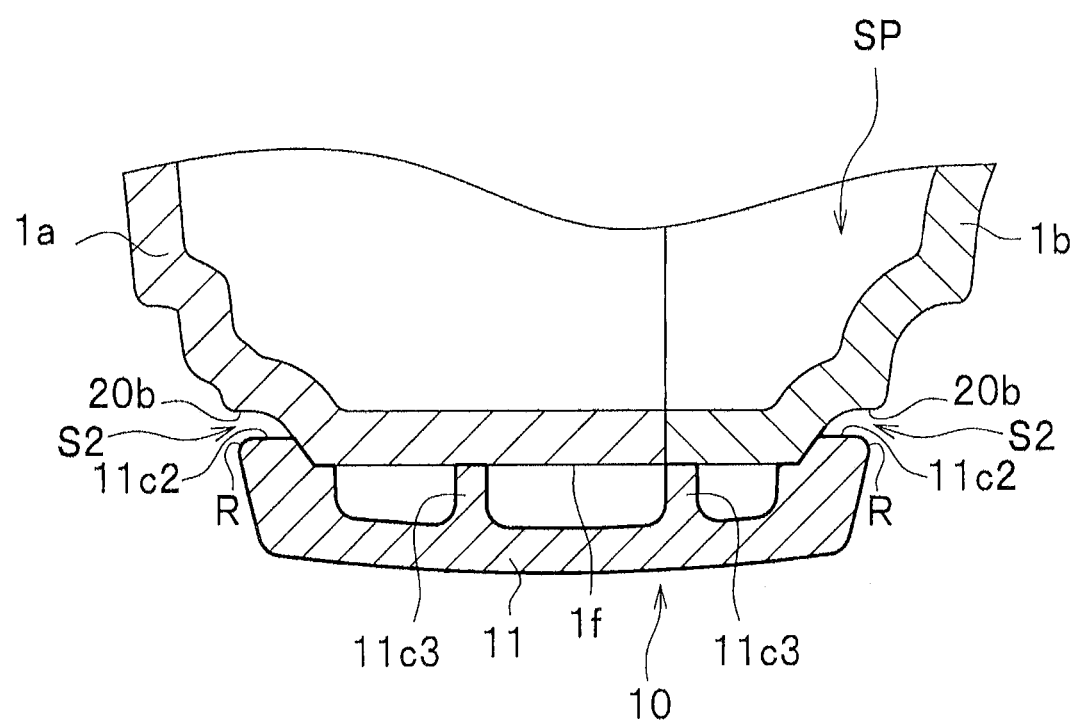

As shown in FIGS. 5a and 8a, a pair of ribs 11c3, 11c3 may be projected from the inner surface of the base 11. The ribs 11c3 may extend along the front-rear direction of the base 11 and may be opposed to a lower surface 1f of the cover mounting portion 20, as shown in FIGS. 6a, and 8a.

The ribs 11c3 may be either disposed so as to contact the lower surface 1f or disposed so as to maintain a small gap without contacting the lower surface 1f. The ribs 11c3 may also partially contact the lower surface 1f.

As shown in FIGS. 3b and 8a, each of the left and right side edges 11c2, 11c2 of the base 11 may be opposed to the border portions 20b (step portions) of the cover mounting portion 20 with a groove-like gap S2 maintained therebetween. That is, when the cover member 10 is mounted on the cover mounting portion 20, the left and right side edges 11c2, 11c2 may not contact the border portions 20b.

Figure 5B:
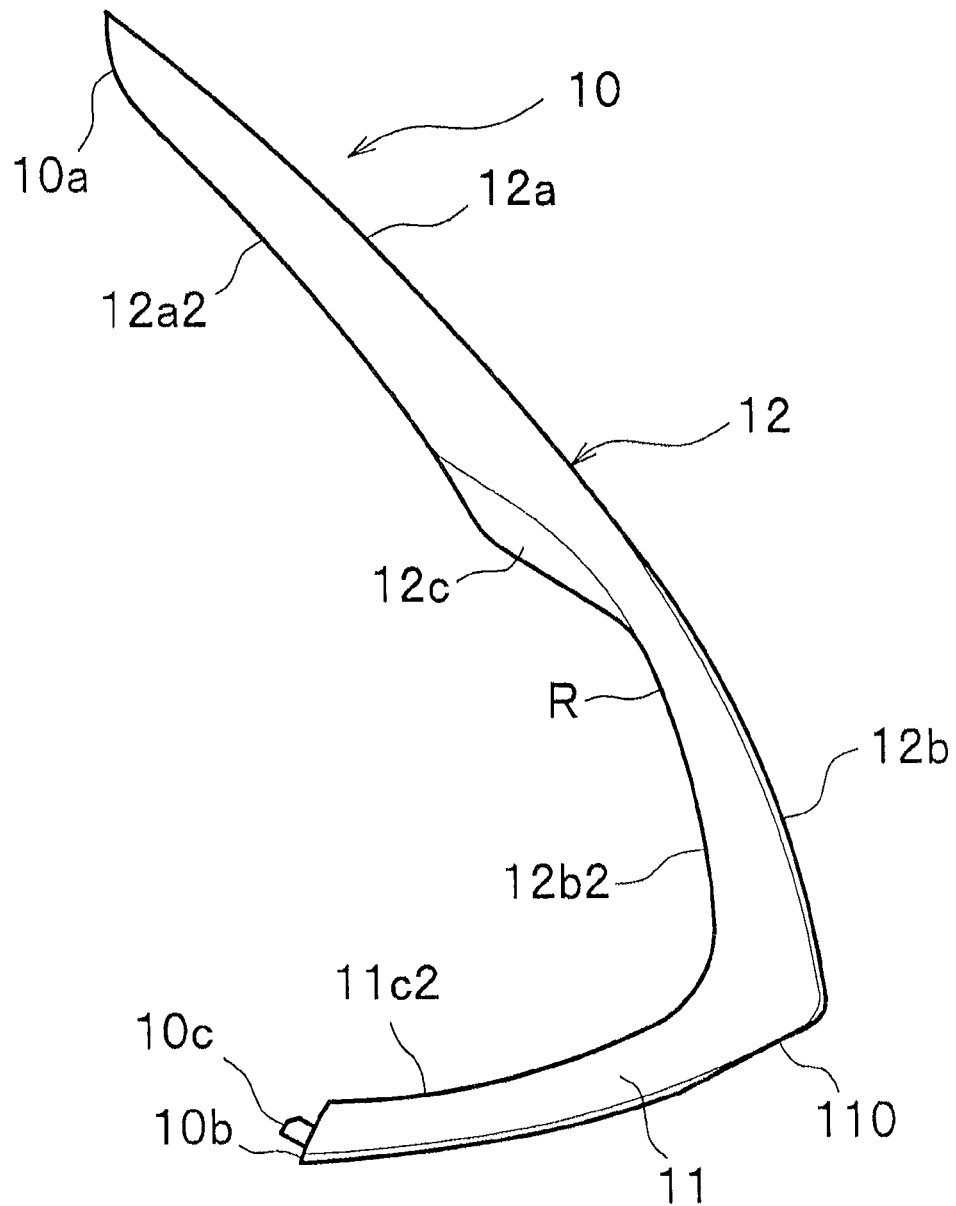
FIG. 5b is a side view of the same.

As shown in FIGS. 3a, 3b, and 5b, the rising portion 12 may be bent outward along the top-bottom direction in an arc shape projecting outward. The rising portion 12 may include an upper portion 12a and a lower portion 12b.

Figure 5C:
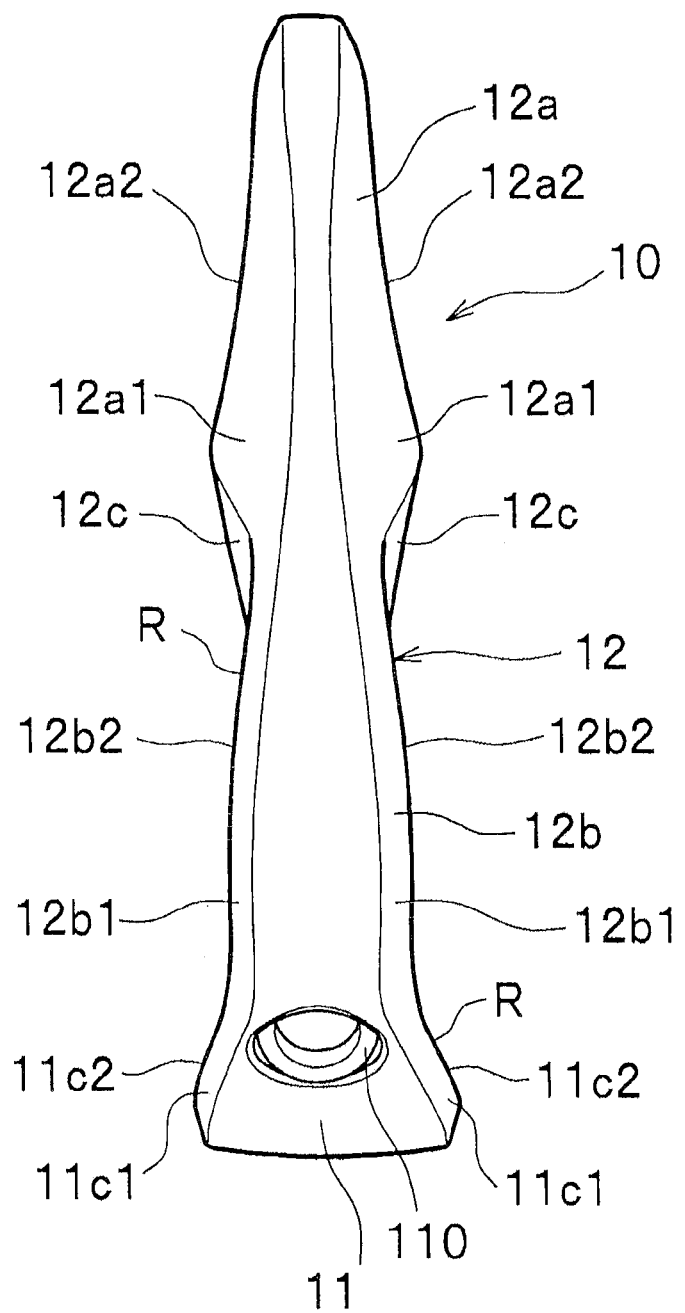
FIG. 5c is a rear view of the same.
Figure 5D:
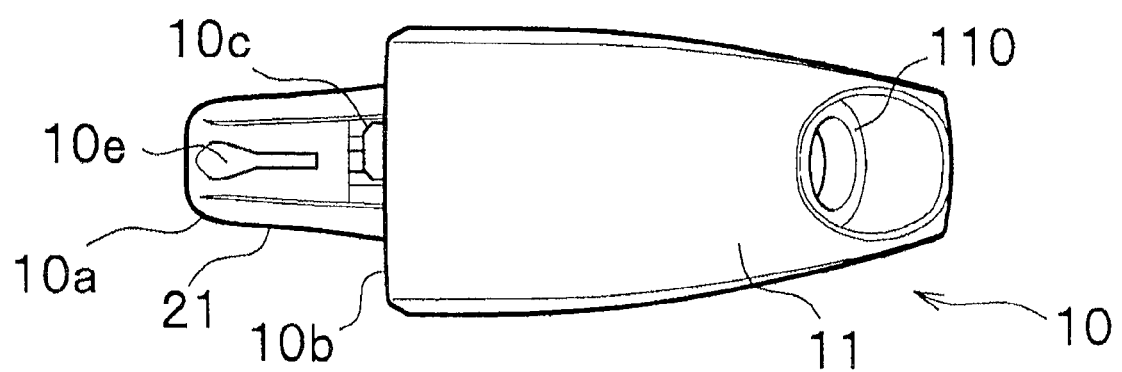
FIG. 5d is a bottom view of the same.

The upper portion 12a may be continuous to the leg 1c and cover the cover mounting portion 20. As shown in FIG. 5c viewed from behind, the upper portion 12a may have such a shape that the left and right side portions 12a1, 12a1 diverge from each other in a left-right direction (in an axial direction of the handle shaft 2a) toward the middle portion of the rising portion 12 and converge in a left-right direction at the narrow portions 12c, 12c. The narrow portions 12c, 12c may serve as a knob picked up with fingers for mounting the cover member 10 on the cover mounting portion 20.

Figure 6B:
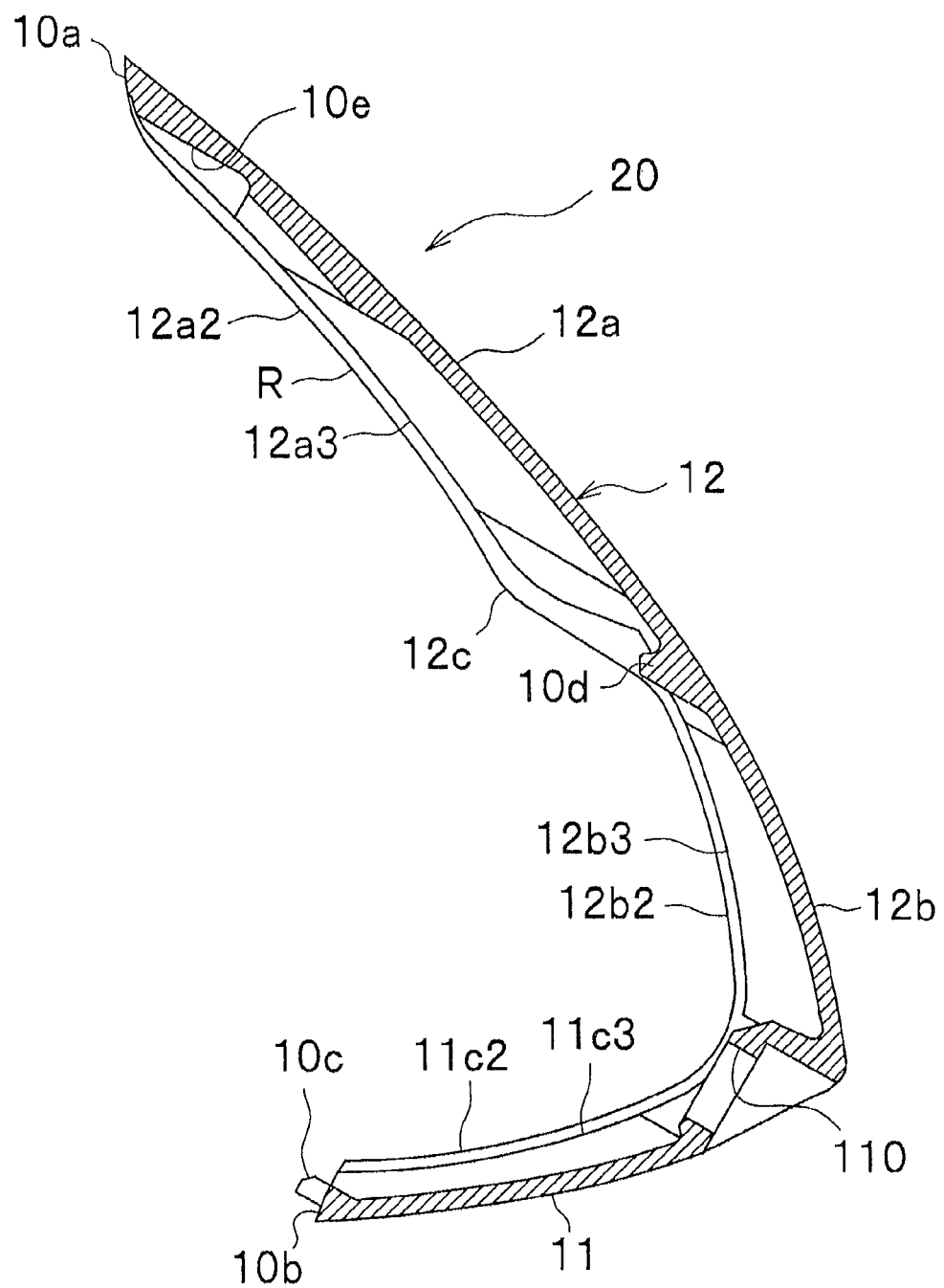
FIG. 6b shows a vertical section of the cover member.

The top end 10a of the upper portion 12a may have a shape conforming to an upper wall 21 (see FIGS. 3a and 6a) of the cover mounting portion 20, and is configured to abut the upper wall 21 from behind (in an obliquely upward direction) when the cover member 10 is mounted. As shown in FIGS. 5a and 6b, a concave groove 10e may be formed in an inner surface of the top end 10a so as to extend along the longitudinal direction of the rising portion 12. As shown in FIG. 6a, the concave groove 10e can be engaged with a projection 1h provided near the upper wall 21 of the cover mounting portion 20.

Figure 9A:
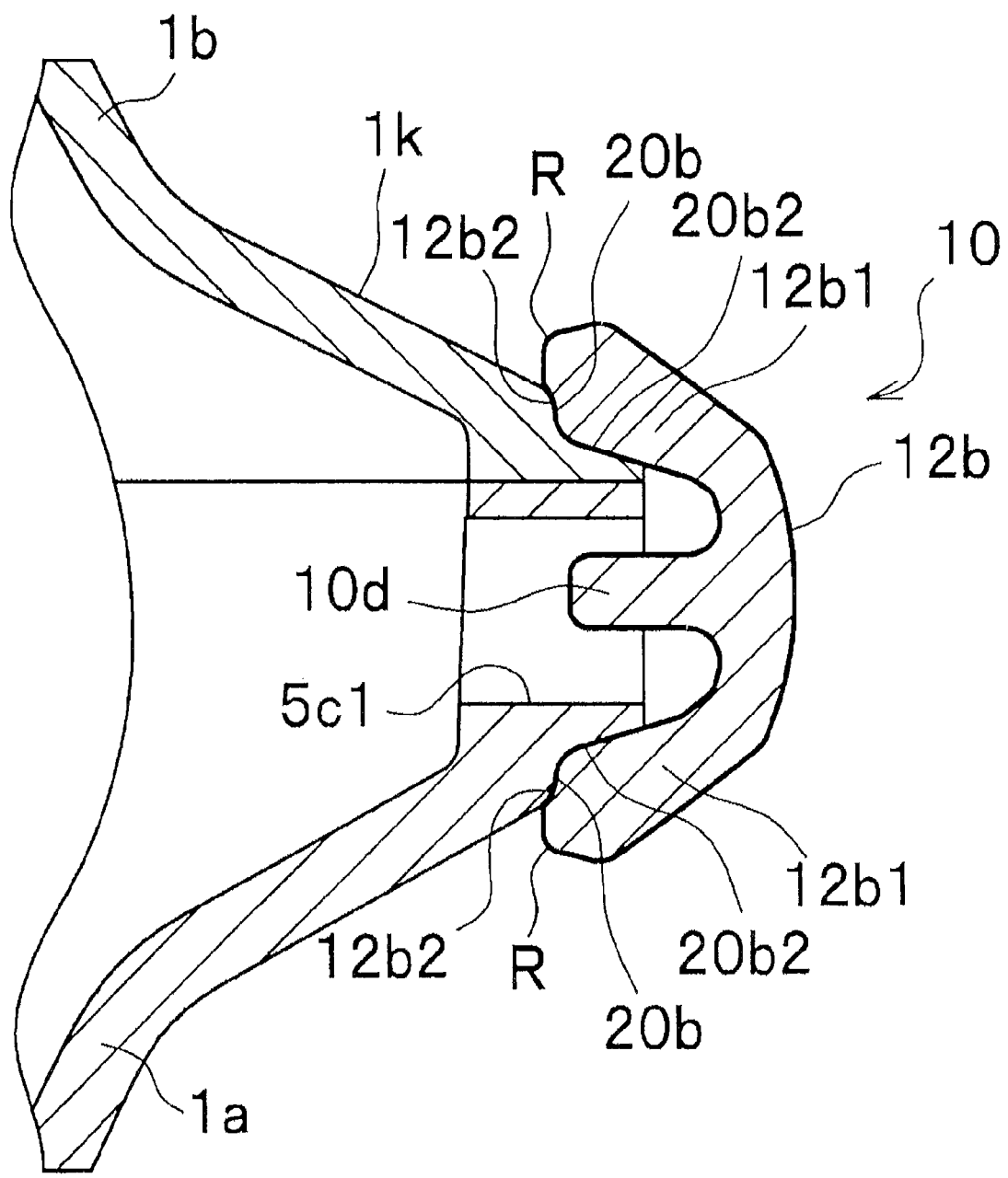
Figure 9B:
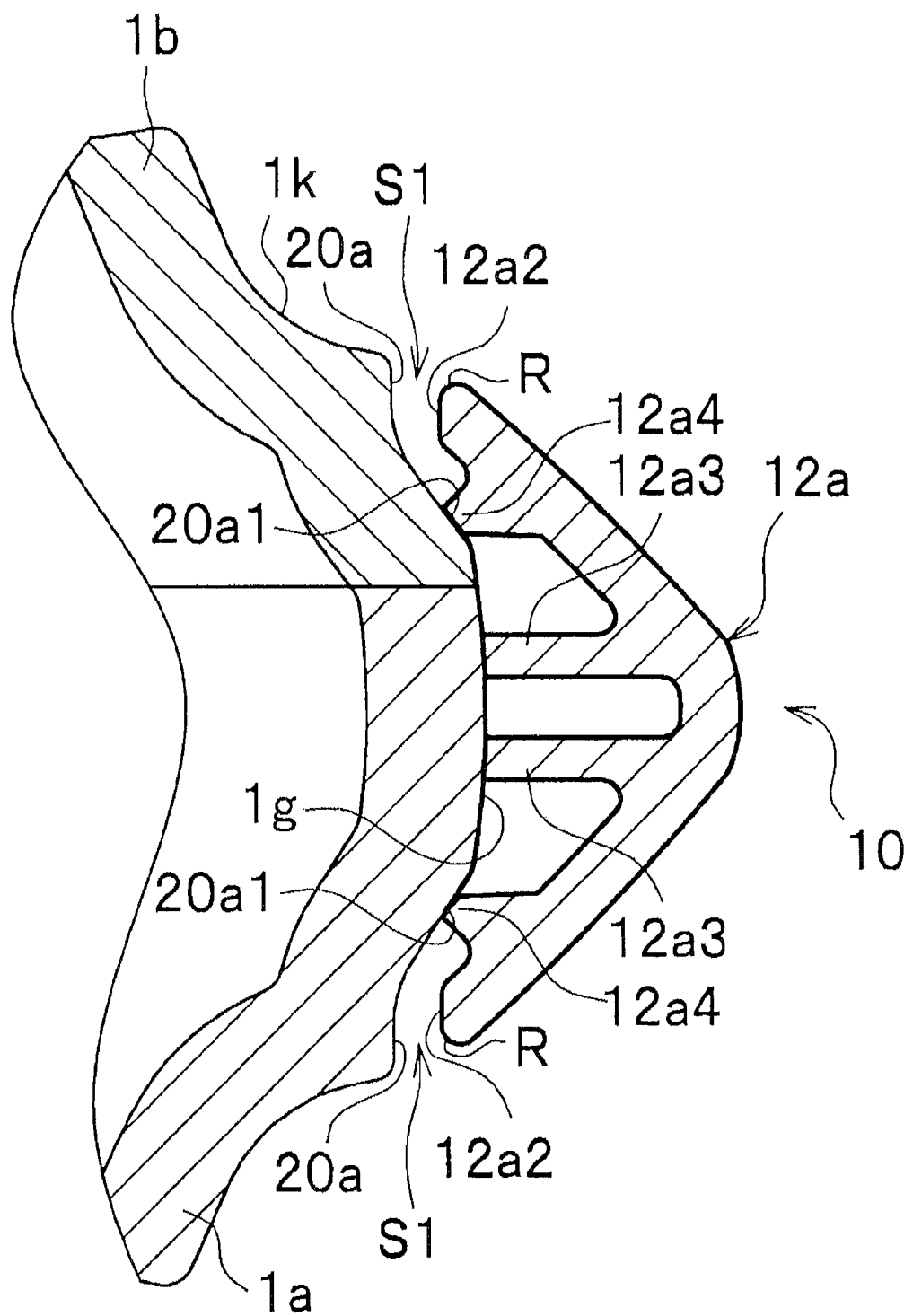
Figure 9C:
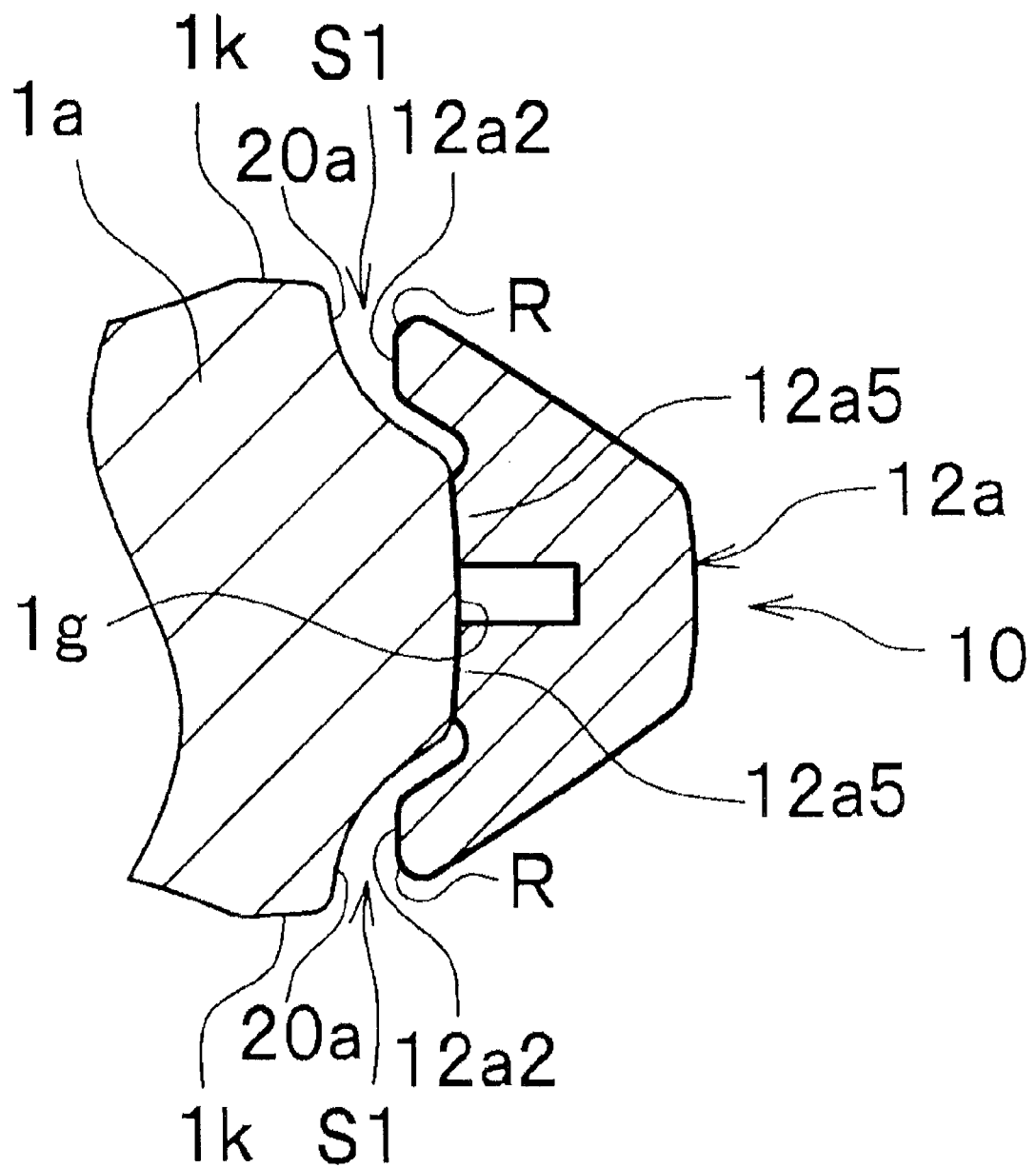

As shown in FIGS. 9b and 9c, the upper portion 12a may have a substantially triangular section. As shown in FIGS. 5a, 9b, and 9c, a pair of ribs 12a3, 12a3 and ribs 12a5, 12a5 continuous thereto may be projected from the inner surface of the upper portion 12a. The rib 12a3 and the rib 12a5 may be disposed along the longitudinal direction of the upper portion 12a so as to be opposed to an upper rear surface 1g of the cover mounting portion 20.

The rib 12a3 and the rib 12a5 may be either disposed so as to contact the upper rear surface 1g or disposed so as to maintain a small gap without contacting the upper rear surface 1g. The rib 12a3 and the rib 12a5 may also partially contact the upper rear surface 1g.

As shown in FIGS. 3b, 9b, and 9c, each of the left and right side edges 12a2, 12a2 of the upper portion 12a may be opposed to the border portions 20a (step portions) of the cover mounting portion 20 with groove-like gaps S1 maintained therebetween. That is, when the cover member 10 is mounted on the cover mounting portion 20, the left and right side edges 12a2, 12a2 may not contact the border portions 20a. As shown in FIG. 3b, the left and right side portions 12a1, 12a1 of the cover member 10 may be continuous to the left and right side portions 12b1, 12b1 of the lower portion 12b via the narrow portions 12c, 12c.

As shown in FIGS. 5a and 9b, inner ribs 12a4, 12a4 may be provided between the rib 12a3 and the left side edge 12a2 and between the rib 12a3 and the right side edge 12a2. As shown in FIG. 9b, the inner ribs 12a4, 12a4 may be opposed to slopes 20a1, 20a1 continuous to the border portions 20a.

As shown in FIG. 3a, the upper rear surface 1g of the cover mounting portion 20 may be concave and positioned ahead of the lower rear surface 1f1 on which the lower portion 12b is mounted.

As shown in FIG. 3a, the upper rear surface 1g may be continuous to the lower rear surface 1f1 via the middle wall 24. As shown in FIG. 3b, the middle wall 24 may be covered by the narrow portions 12c, 12c from both left and right sides thereof (only the left side is shown in the figure).

The lower portion 12b may be continuous to the upper portion 12a and cover the cover mounting portion 20. As shown in FIG. 5c viewed from behind, the lower portion 12b may be curved such that the left and right side portions 12b1, 12b1 gently expand to the left and right side, respectively.

As shown in FIG. 5b, the lower end of the lower portion 12b may be continuous to the rear end of the base 11; and as shown in FIG. 5c, the left and right side portions 12b1, 12b1 of the lower portion 12b may be continuous to the left and right side portions 11c1, 11c1 of the base 11, respectively.

Figure 7A:
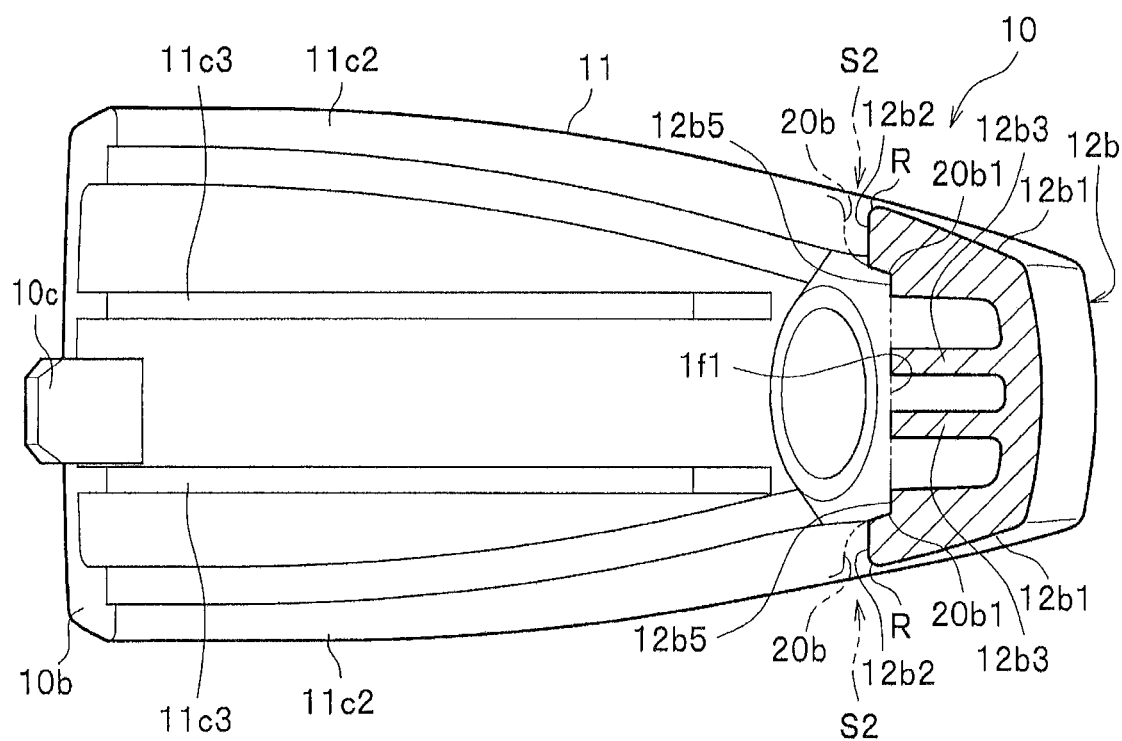
Figure 7B:
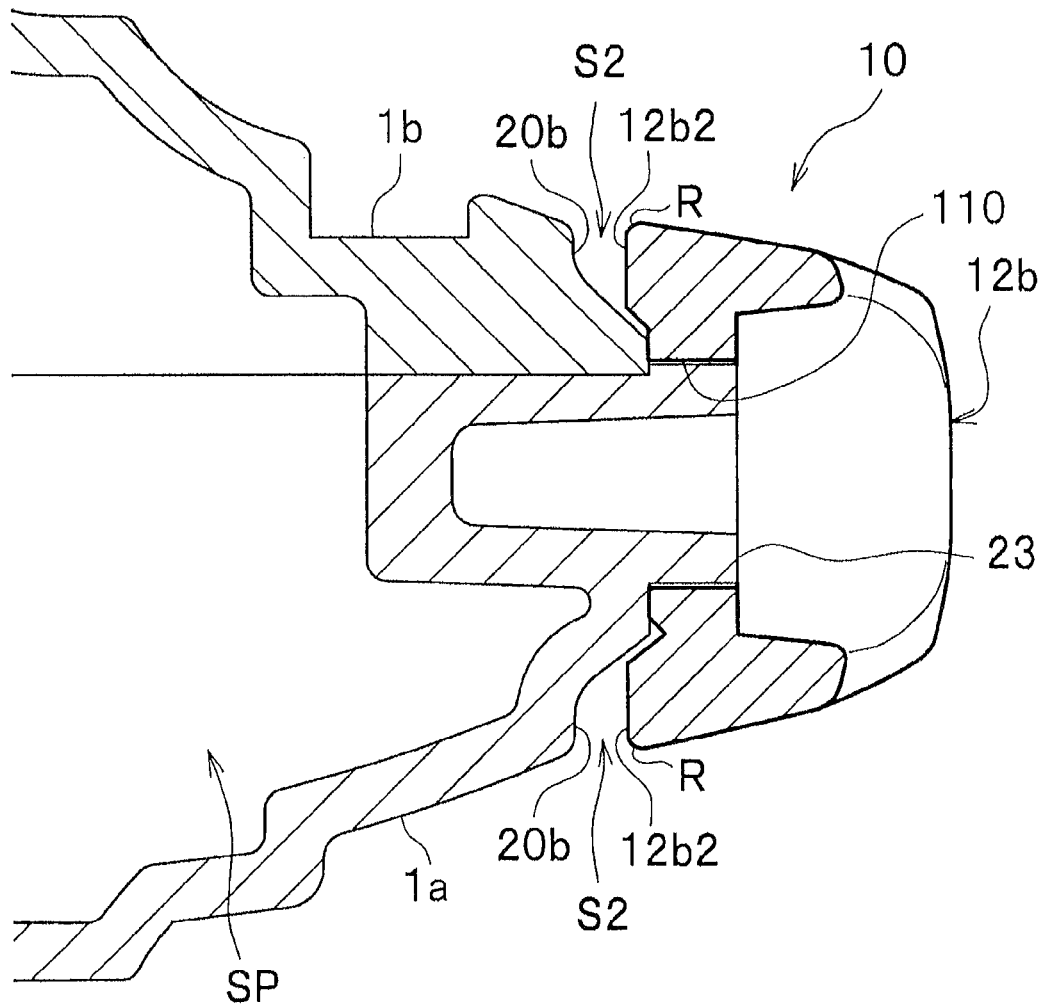
Figure 8B:
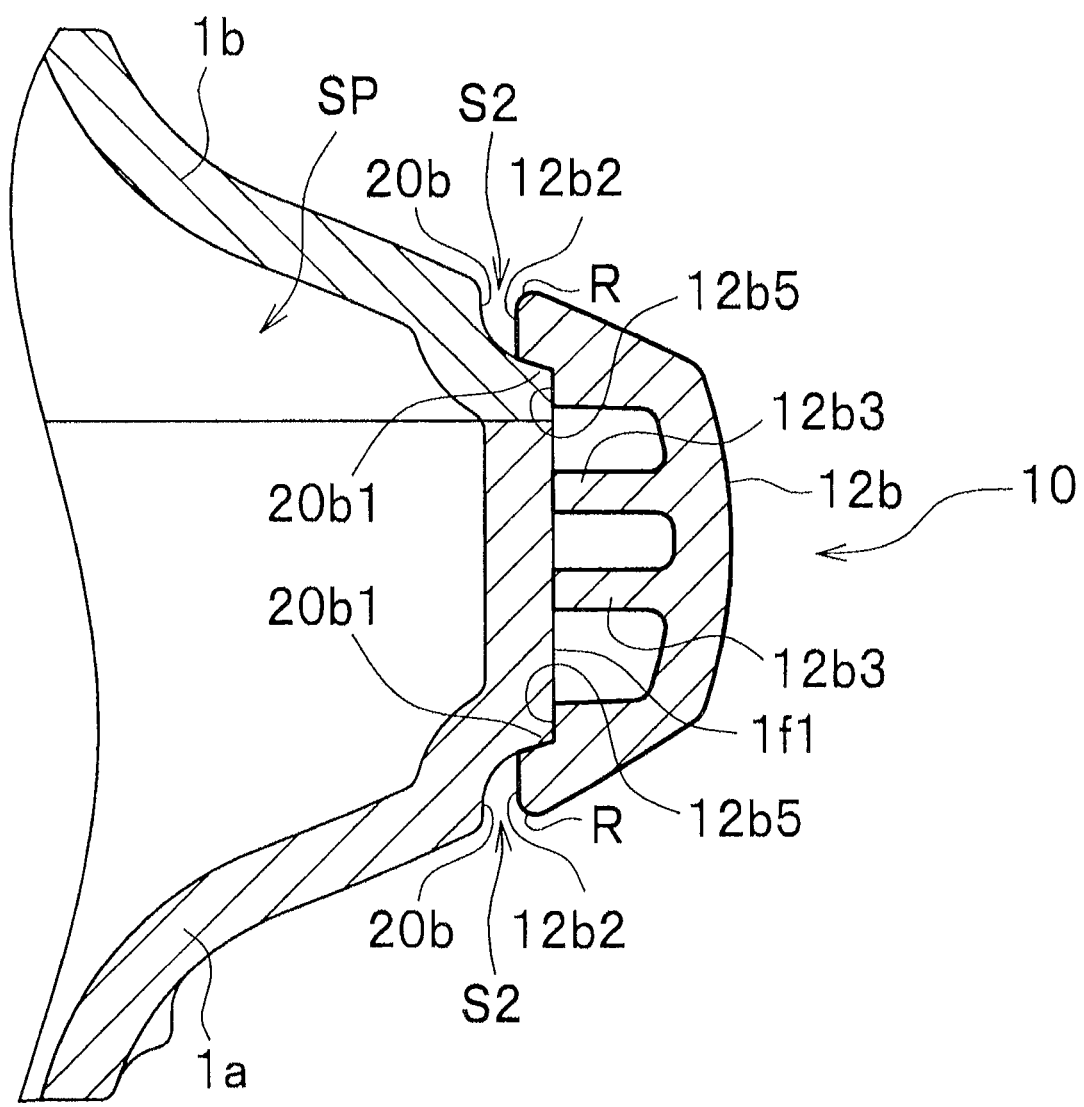

As shown in FIGS. 5a, 7a, and 8b, a pair of ribs 12b3, 12b3 may be projected from the inner surface of the lower portion 12b. The ribs 12b3 may extend along the longitudinal direction of the lower portion 12b and may be opposed to a lower rear surface 1f1 of the cover mounting portion 20, as shown in FIG. 6a.

The ribs 12b3 may be either disposed so as to contact the lower rear surface 1f1 or disposed so as to maintain a small gap without contacting the lower rear surface 1f1. The ribs 12b3 may also partially contact the lower rear surface 1f1.

As shown in FIGS. 3b, 7a, and 8b, each of the left and right side edges 12b2, 12b2 of the lower portion 12b may be opposed to the border portions 20b (step portions) of the cover mounting portion 20 with groove-like gaps S2 maintained therebetween. That is, when the cover member 10 is mounted on the cover mounting portion 20, the left and right side edges 12b2, 12b2 may not contact the border portions 20b. The groove-like gap S2 may be formed continuously from the lower portion 12b to the base 11. The groove-like gap S2 may have a substantial L-shape in a side view.

As shown in FIGS. 7a and 8b, steps 12b5, 12b5 may be formed in the inner surface of the left and right side edges 12b2, 12b2. The steps 12b5, 12b5 may be opposed to the corners 20b1, 20b1 of the lower rear surface 1f1, respectively, and may be configured to abut the corners 20b1, 20b1 from left and right sides, respectively, when the cover member 10 is mounted.

The steps 12b5 may be disposed so as to maintain a small gap without contacting the corners 20b1. The steps 12b5 may also partially contact the corners 20b1.

The steps 12b5, 12b5 correspond to "second abutting portions" recited in the claims.

As shown in FIG. 9a, a projection 10d may be formed in the inner surface of the lower portion 12b. The projection 10d may be inserted into an support hole 5c1 provided in the rear portion of the reel body 1. Into the support hole 5c1 may be inserted the support member 5c for the spool shaft 5 from ahead (see FIG. 2).

As shown in FIG. 9a, contact surfaces 20b2, 20b2 may be provided on both sides of the support hole 5c1 so as to be continuous to the border portions 20b. The contact surfaces 20b2, 20b2 may be opposed to the inner surfaces of the left and right side portions 12b1, 12b1, respectively. The inner surfaces of the left and right side portions 12b1, 12b1 may be configured to abut the contact surfaces 20b2, 20b2 from the left and right sides, respectively, when the cover member 10 is mounted. That is, the substantially middle portion of the rising portion in a top-bottom direction 12 may abut the cover mounting portion 20 from both left and right sides for positioning.

Further, the left and right side edges 12b2, 12b2 may partially contact the border portions 20b, 20b.

In the embodiment, the front ends of the left and right side portions 12b1, 12b1 may be positioned to project sideways beyond the left and right side surfaces 1k of the reel body 1, respectively. That is, the cover member 10 may be mounted in a varied way.

The inner surfaces of the left and right side portions 12b1, 12b1 correspond to "second abutting portions" recited in the claims.

The corners R of the left and right side edges 12a2, 12b2, 12c2 of the cover member 10 may be chamfered as shown in the figures. In the embodiment, the corners R may be rounded but can also be chamfered into a plane surface.

To mount the cover member 10 on the cover mounting portion 20, the cover member 10 may be brought close to the cover mounting portion 20 from behind and below the cover mounting portion 20, until the top end 10a of the rising portion 12 of the cover member 10 may abut the top wall 21 of the cover mounting portion 20 from behind, and the front end 10b of the base 11 may abut the lower front wall 22 of the cover mounting portion 20 from behind. Thus, as shown in FIG. 7a, the steps 12b5, 12b5 of the rising portion 12 may abut the corners 20b1, 20b1 of the lower rear surface 1f1 of the cover mounting portion 20 from both left and right sides, respectively. Further, as shown in FIG. 9a, the inner surfaces of the left and right side portions 12b1, 12b1 of the rising portion 12 may abut the contact surfaces 20b2, 20b2 of the cover mounting portion 20 from both left and right sides, respectively.

Thus, the cover member 10 may abut the cover mounting portion 20 in the rear portion of the reel body 1 from the above-described two directions so as to be positioned.

When the cover member is thus positioned, there may be formed the groove-like gaps S1 between the border portions 20a of the cover mounting portion 20 and the left and right side edges 12a2 of the cover member 10. Also, there may be formed the groove-like gaps S2 between the border portions 20b of the cover mounting portion 20 and the left and right side edges 12b2, 12c2 of the cover member 10.

With the groove-like gaps S1, S2 formed as described above, the cover member 10 may be fixed on the cover mounting portion 20 with the setscrew 111 inserted through the screw hole 110 in the base 11.

The entire lengths of the groove-like gaps S1, S2 should preferably be about 70% or more of the entire lengths of the border portions 20a, 20b.

In the fishing spinning reel of the embodiment as described above, the first abutting portions and the second abutting portions may abut the cover mounting portion 20 in the rear portion of the reel body 1 such that the cover member 10 may be positioned; therefore, the cover member 10 can be installed with an excellent quality.

Also, since the cover member 10 may be positioned while abutting the rear portion of the reel body 1 from two directions, the cover member 10 can be mounted on the reel body 1 with the looseness suppressed adequately.

Further, since there are groove-like gaps S1, S2 maintained between the cover member 10 mounted and the border portions 20a, 20a of the cover mounting portion 20, the left and right side edges 12a2, 12b2, 12c2 of the cover member 10 may not be mated with the border portions 20a, 20b. Therefore, the cover member 10 can be mounted on the reel body 1 without looseness.

Because of the presence of the groove-like gaps S1, S2, replacement of the pressing die for forming the cover member 10 may require least necessary alteration of other dies for conformity. Accordingly, the cost can be reduced.

Since the presence of the first abutting portions may enable positioning of at least two portions in the cover member 10 spaced in a top-bottom direction onto the cover mounting portion 20, the cover member 10 can be stably mounted on the cover mounting portion 20. In the embodiment, the cover member 10 may be positioned on the cover mounting portion 20 with the two portions serving as the first abutting portions, that is, the top end 10a of the rising portion 12 of the cover member 10 and the front end 10b of the base 11; but the first abutting portions are not limited to these portions but may be other two portions.

Since the presence of the second abutting portions may enable the substantially middle portion of the cover member 10 in a top-bottom direction to abut the cover mounting portion 20 in the rear portion of the reel body 1 from both left and right sides for mounting, the cover member 10 can be stably mounted on the cover mounting portion 20 while suppressing the looseness in the left-right direction adequately.

Further, since the corners R of the left and right side edges 12a2, 12b2, 11c2 of the cover member 10 are chamfered, the risk of snagging of a line (not shown) contacting the cover member 10 may be reduced. Therefore, this arrangement may reduce loss of operation caused by snagging of a line, producing excellent fishing operability.

Further, since the cover member 10 is mounted such that the left and right side edges 12a2, 12b2, 11c2 overlaps the left and right side surfaces 1k of the rear end of the reel body 1 (in a side view), the rear portion of the reel body 1 may be adequately covered to protect damage of the rear portion adequately. Therefore, this arrangement may prevent removal of the surface treatment layer in the rear portion of the reel body 1 and corrosion after the removal. Further, the cover member 10 may adequately relieve the impact on the reel body 1 due to dropping.

Still further, the groove-like gaps S1, S2 may be less prone to accumulate dust or seawater and thus may not induce corrosion.

Second Embodiment

Figure 10:
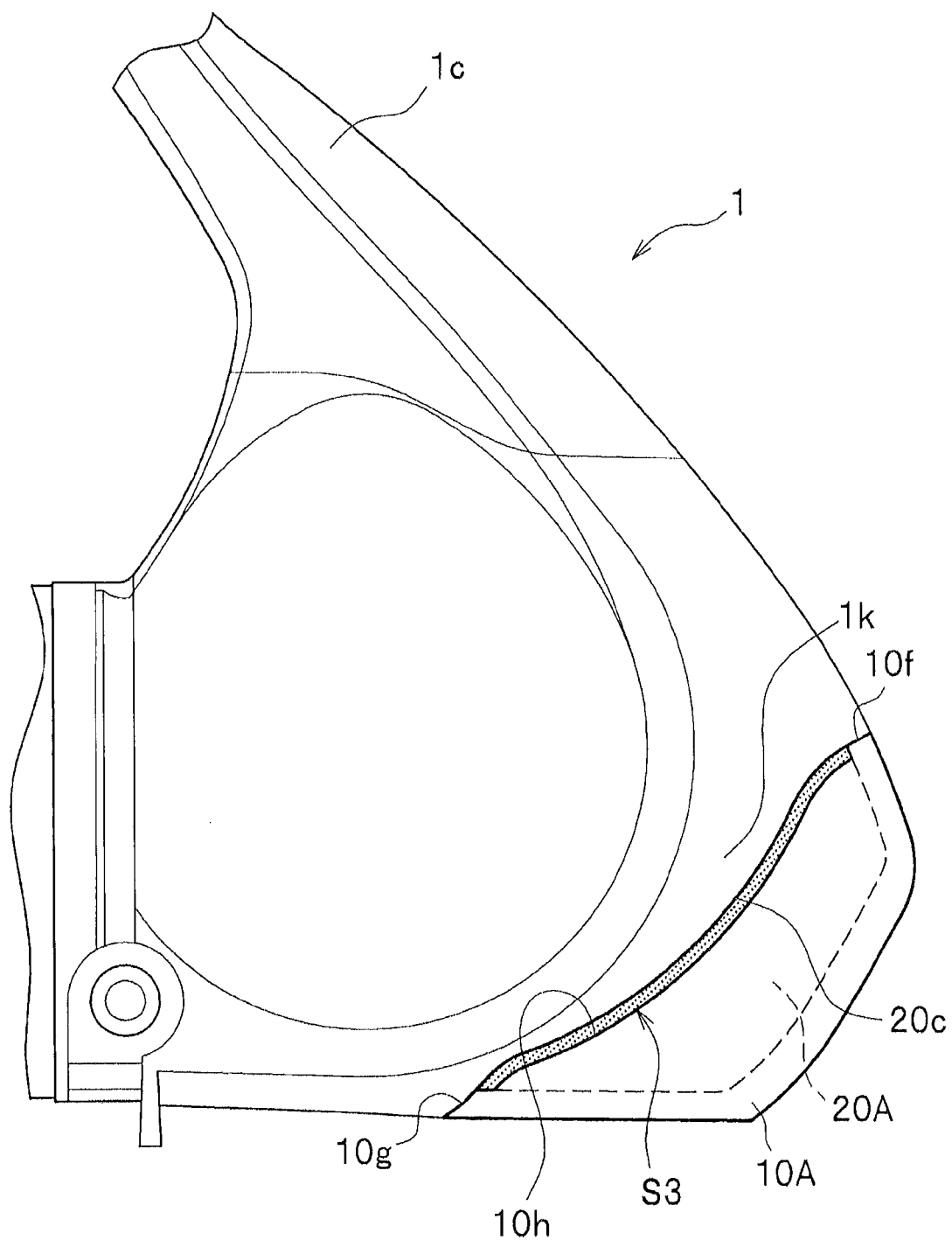
FIG. 10 is a side view of the rear portion of the reel body showing an exemplary variation of the cover member.

Next, the second embodiment of the fishing spinning reel will now be described with reference to FIG. 10. In this embodiment, a cover mounting portion 20A may be provided on the rear corner of the reel body 1.

A cover member 10A may be mounted on the cover mounting portion 20A. The cover member 10A may be mounted with opposite ends 10f, 10g thereof abutting border portions 20c of the cover mounting portion 20A. There may be formed groove-like gaps S3 between the border portions 20c and the left and right side edges 10h (only one of them is shown) of the cover member 10A mounted.

This embodiment can produce the same advantageous effects as the first embodiment. That is, this embodiment provides a fishing spinning reel wherein the cover member 10A can be mounted on the reel body 1 tightly.

Embodiments of the present invention are not limited to the above descriptions and are susceptible to various modifications.

For example, the groove-like gaps S1, S2, S3 may have a desired entire length and a desired width as long as these gaps can absorb the defective mating between the cover members 10, 10A and the border portions due to dimension errors of the cover members 10, 10A.

Further, it may also be possible that two portions in the cover members 10, 10A spaced in a top-bottom direction abut the corresponding portions for positioning the cover members 10, 10A.

What is claimed is:

1. A fishing spinning reel comprising:
    a reel body;
    a cover mounting portion provided on a rear portion of the reel body; and
    a cover member mounted on the cover mounting portion and covering the rear portion of the reel body,
    the cover member comprising:
    at least one first abutting portion abutting the cover mounting portion from behind; and
    at least one second abutting portion abutting the cover mounting portion from both left and right sides,
    wherein when the cover member is mounted on the cover mounting portion via the at least one first abutting portion and the at least one second abutting portion, gaps are formed in left and right side surfaces of the reel body between border portions of the cover mounting portion and left and right side edges of the cover member.

2. The fishing spinning reel of claim 1 wherein the at least one first abutting portion comprises at least two first abutting portions provided at least two positions on the cover member spaced in a top-bottom direction.

3. The fishing spinning reel of claim 1 wherein the at least one second abutting portion is provided at a substantially middle position on the cover member in a top-bottom direction.

4. The fishing spinning reel of claim 1 wherein the left and right side edges of the cover member are chamfered.

* * * * *